United States Patent
Ogishi

(10) Patent No.: US 7,889,740 B2
(45) Date of Patent: Feb. 15, 2011

(54) ROUTING INFORMATION MANAGEMENT APPARATUS AND COMPUTER PROGRAM OF THE SAME

(75) Inventor: Tomohiko Ogishi, Fujimino (JP)

(73) Assignee: KDDI Corporation, Tokyo (JP)

( * ) Notice: Subject to any disclaimer, the term of this patent is extended or adjusted under 35 U.S.C. 154(b) by 141 days.

(21) Appl. No.: 12/122,385

(22) Filed: May 16, 2008

(65) Prior Publication Data

US 2008/0285563 A1    Nov. 20, 2008

(30) Foreign Application Priority Data

May 17, 2007    (JP)    ............... 2007-131535

(51) Int. Cl.
*H04L 12/56* (2006.01)
(52) U.S. Cl. .................. 370/392; 370/238; 370/352
(58) Field of Classification Search .......... 370/217, 370/352, 235, 221, 238, 392
See application file for complete search history.

(56) References Cited

U.S. PATENT DOCUMENTS

| | | | | |
|---|---|---|---|---|
| 7,218,605 B2 * | 5/2007 | Ochiai et al. | ................ | 370/216 |
| 7,606,160 B2 * | 10/2009 | Klinker et al. | .............. | 370/238 |
| 2003/0086422 A1 * | 5/2003 | Klinker et al. | .............. | 370/389 |
| 2004/0081154 A1 * | 4/2004 | Kouvelas | .................... | 370/392 |

OTHER PUBLICATIONS http://www.nanog.org/lookingglass.html, May 14, 2008.
http://www.routeviews.org/, May 14, 2008.
http://www.ripe.net/, May 14, 2008.
http://www.quagga.net/, May 14, 2008.
http://www.zebra.org/, May 14, 2008.

* cited by examiner

*Primary Examiner*—William Trost, IV
*Assistant Examiner*—Emmanuel Maglo
(74) *Attorney, Agent, or Firm*—Morgan, Lewis & Bockius LLP

(57) ABSTRACT

In order to provide the routing information of both the present time and the past, provide the latest routing information very quickly and improve searching speed of the routing information, a routing information management apparatus includes: a routing information receiving portion receiving routing information which broadly notifies a change/withdrawal of a communication route and which is received from an observation apparatus of communication routes; and a routing state table generation portion which generates a routing state table of each of the communication routes including both a route existing time based on a received time of the routing information and a range of an address space obtained by digitizing a prefix involved in the routing information, and which stores the routing state table in a routing information database.

8 Claims, 2 Drawing Sheets

ROUTING INFORMATION MANAGEMENT APPARATUS AND COMPUTER PROGRAM OF THE SAME

BACKGROUND OF THE INVENTION

1. Field of the Invention

The present invention relates to a routing information management apparatus and a computer program for managing the routing information (hereinafter, route). Priority is claimed on Japanese Patent Application No. 2007-131535, filed May 17, 2007, the content of which is incorporated herein by reference.

2. Description of Related Art

The Internet is constituted by connecting autonomous TCP (Transmission Control Protocol)/IP (Internet Protocol) networks (autonomous system: AS) provided by various groups (for example, internet service providers (ISP) and companies) to each other. An identification number (AS number) is assigned to each of ASs. AS is constituted from a group of network connection apparatuses (e.g. router) which are operated based on a common routing management policy. The router has a routing table and conducts routing operations of packets based on the routing table. The routing table is constituted from a list of the routing information. The routing information includes: prefixes (combination of an IP address and a bit number of a subnet mask) which are a group of destination addresses; IP addresses of neighboring routers used for reaching the prefix; and the attribute information indicating, for example, a priority. If the routing table includes the routing information which contains a prefix including a certain destination address, it is clear that there is a route to the destination address from the router. The routers update the routing table by exchanging the routing information with each other. BGP (Border Gateway Protocol) is used for exchanging the routing information. The routers have a BGP communication function and exchange the routing information each other. The routing information is called a BMP route update message (UPDATE message). Changing and withdrawing of a route is widely notified by using the UPDATE message. "ANNOUNCE" is a type of the UPDATE message for widely notifying a change of a route. "WITHDRAW" is a type of the UPDAFE message for widely notifying a withdrawal of a route.

In a conventional case, for example, described in Non-Patent Documents 1-5, techniques are known for a network operator of an AS to acquire the routing information obtained by another AS. A conventional technique shown in Non-Patent Document 1 is a mechanism in which one AS provides an input means of router commands to other AS. In accordance with Non-Patent Document 1, a network operator can obtain the latest routing information of other AS by inputting router commands by using "telnet" or via the Web. Non-Patent Documents 2 and 3 show conventional techniques that set the routing information obtained by gathering from multiple AS accessible via Web. The routing information is stored in files in a standard format called "MRT". MRT is constituted from both RIB (Routing Information Base) which has a snapshot of all prefixes at a predetermined time and UPDATE messages with one-to-one correspondence to all changes of the routes conducted in a predetermined interval. In accordance with the conventional techniques described in Non-Patent Documents 2 and 3, the network operator can refer to the latest and past routing information of other AS by downloading and analyzing files of the routing information. Non-Patent Document 4 and 5 show conventional techniques of a communication program of BGP that receives the routing information by using BGP and stores the routing information in accordance with MRT. However, there are the following problems in the above-described conventional techniques.

In Non-Patent Document 1, it is possible to obtain only the current routing information, and it is not possible to obtain the routing information which can be used for analyzing problems in the past. In Non-Patent Documents 2-5, it takes a long time for obtaining desired routing information by a network operator.

There are two reasons of these problems. A first reason is that both operations of storing information in the MRT format and uploading the information on the Web are conducted at a predetermined interval. A second reason is that the MRT format has been designed without consideration of searching performance of the routing information, and consequently, it takes time to obtain the desired routing information by searching the stored information recorded in the MRT format. For example, the following operations are necessary in order to find a route for reaching an IP address at a specific time. First, RIB just before the specified time is searched, and all routes including the specified IP address are extracted. Regularly, the RIB stores the all routes over the network (in general, 200,000 in the Internet), and it is necessary to search the all routes. In addition, in order to check whether or not there are changes of the routes of the specified IP address, it is necessary to search all the UPDATE messages issued between a time of generating the RIB and a specified time. In addition, in the conventional techniques of Non-Patent Documents 2-5, it is necessary to additionally provide a mechanism for analyzing the routing information. A tool is provided that shows a file which is in the MRT format in text, but a tool is not provided which can analyze the routing information of the specified IP address and/or the specified time that is necessary for investigating problems. Therefore, in conventional cases, the network operator has produced such analysis tools by himself.

[Non-Patent Document 1]
Internet <URL: http://www.nanog.org/lookingglass.html>, [searched on May 10, 2007]

[Non-Patent Document 2]
Internet <URL: http://www.routeviews.org/>, [searched on May 10, 2007]

[Non-Patent Document 3]
Internet <URL: http://www.ripe.net/>, [searched on May 10, 2007]

[Non-Patent Document 4]
Internet <URL: http://www.quagga.net/>, [searched on May 10, 2007]

[Non-Patent Document 5]
Internet <URL: http://www.zebra.org/>, [searched on May 10, 2007]

SUMMARY OF THE INVENTION

The present invention was conceived of in order to solve such problems. The present invention has an objective to provide a routing information management apparatus and a computer program that can provide the routing information of both the present time and the past, provide the latest routing information very quickly and improve the searching speed of the routing information.

In order to solve the above-described problems, the present invention has, for example, the following aspects.

The first aspect is a routing information management apparatus, including:

a routing information receiving unit which receives routing information for broadly notifying a change/withdrawal of a communication route from an observation apparatus of communication routes; and a routing state table generation unit which generates a routing state table with regard to each of the communication routes including both a route existing time based on a received time of the routing information and the range of an address space indicated by a prefix involved in the routing information, and which stores the routing state table in a routing information database.

The second aspect is the above-described routing information management apparatus, further including an index generation unit which creates an index used for searching the routing information database.

The third aspect is the above-described routing information management apparatus, further including a routing information searching unit which conducts a routing information searching operation by accessing the routing information database while using the index.

The fourth aspect is the above-described routing information management apparatus, further including a database management unit removing the routing state table if a predetermined time has passed after the route existing time. The fifth aspect is a computer program stored on a computer readable medium including computer executable instructions for: receiving routing information which broadly notifies a change/withdrawal of a communication route and which is received from an observation apparatus of communication routes; generating a routing state table of each of the communication routes including both a route existing time based on a received time of the routing information and a range of an address space indicated by a prefix involved in the routing information; and storing the routing state table in a routing information database.

The sixth aspect is the above-described computer program stored on a computer readable medium further including computer executable instructions for creating an index used for searching the routing information database.

The seventh aspect is the above-described computer program stored on a computer readable medium further including computer executable instructions for conducting a routing information searching operation by accessing the routing information database while using the index.

The eighth aspect is the above-described computer program stored on a computer readable medium further including computer executable instructions for removing the routing state table if a predetermined time has passed after the route existing time.

In accordance with the present invention, it is possible to provide the routing information of both the present time and the past, provide the latest routing information very quickly and improve searching speed of the routing information.

DETAILED DESCRIPTION OF THE INVENTION

Hereinafter, in reference to the drawings, an embodiment which is an example of the present invention is explained.

Figure 1:
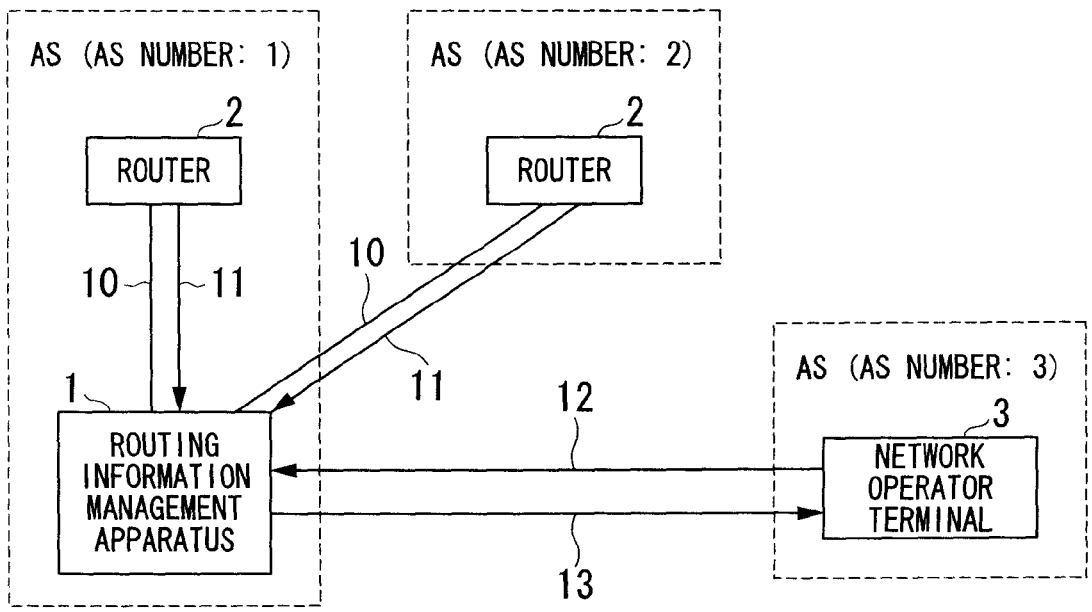
FIG. 1 is a block diagram showing the constitution of the communication network system of an embodiment.

FIG. 1 is a block diagram showing the constitution of a communication network system of the embodiment. In FIG. 1, the communication network system has a constitution in which multiple AS are connected to each other. Each of AS is maintained by and managed by a corresponding group (Internet service provide, company, and the like). In the example in FIG. 1, three AS (AS No. 1, 2 and 3) are shown. It should be noted that the AS numbers are simple to make them easier to explain.

The AS to which the AS number "1" is assigned has a routing information management apparatus 1. The routing information management apparatus 1 establishes BGP sessions 10 with a router 2 inside the same AS and a router 2 of other AS (AS No. 2). The routing information management apparatus 1 receives UPDATE messages 11 from the routers 2 to which the BGP sessions 10 are established. The UPDATE messages 11 are the routing information.

The UPDATE message 11 includes: prefixes (combinations of an IP address and a bit number of a subnet mask) which are a group of destination address; IP addresses of neighboring routers used for reaching the prefix; and the attribute information indicating such as a priority. There are two types of UPDATE messages 11 that are "ANNOUNCE" and "WITHDRAW". The UPDATE message 11 of "ANNOUNCE" is a message for widely notifying changes of routes and includes: information of "ANNOUNCE" which indicates the type of the message; an updated prefix; and characters indicating an AS path for reaching the prefix. The UPDATE message 11 of "WITHDRAW" is a message for widely notifying withdrawal of routes and includes: information of "WITHDRAW" which indicates the type of the message; and a withdrawn prefix.

Figure 3:
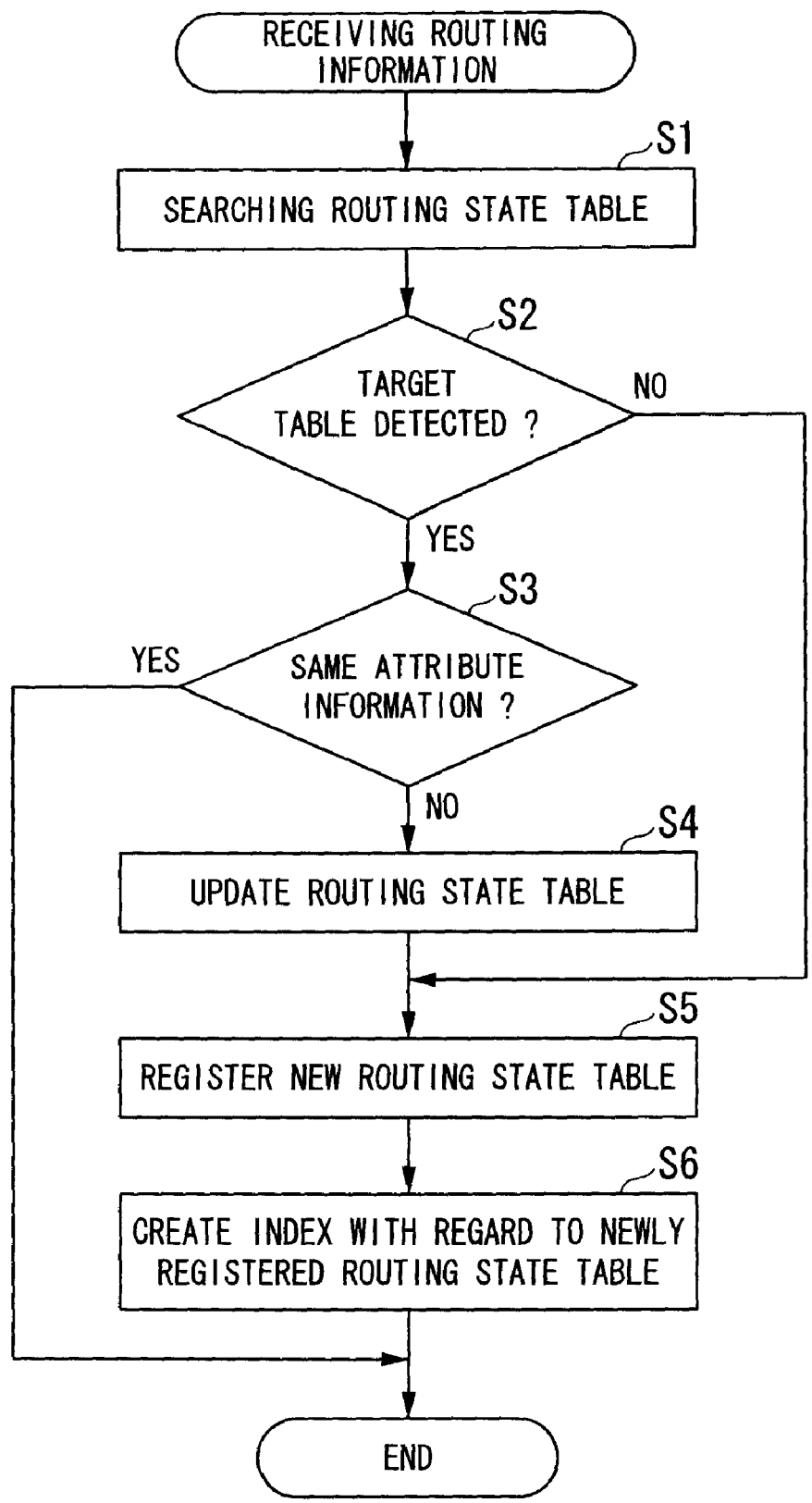
FIG. 3 is a flowchart showing generation steps of a routing state table of the embodiment.

The routing information management apparatus 1 receives the access from a network operator terminal 3. In FIG. 3, the network operator terminal 3 is shown which is inside the AS that has the AS number 3. The network operator operates the network operator terminal 3 in order to access the routing information management apparatus 1, transmit a route search request 12 which is expressed in a manner based on SQL (structured query language) and receive a search result 13.

Figure 2:
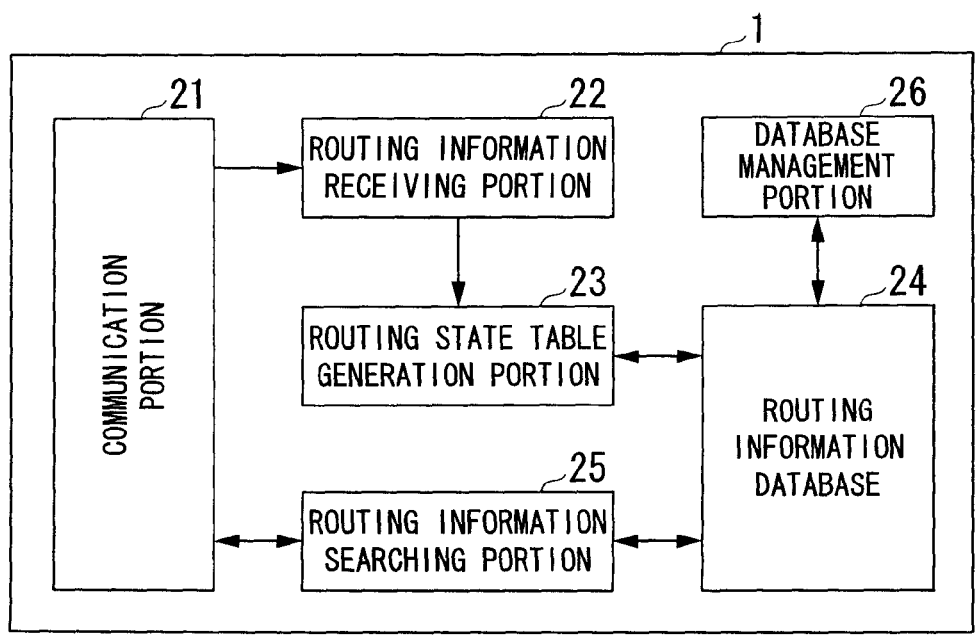
FIG. 2 is a block diagram showing the constitution of the routing information management apparatus 1 of FIG. 1.

FIG. 2 is a block diagram showing a constitution of the routing information management apparatus 1 of FIG. 1. In FIG. 2, the routing information management apparatus 1 includes; a communication portion 21; a routing information receiving portion 22, a routing state table generation portion 23, a routing information database 24, a routing information searching portion 25 and a database management portion 26.

The communication portion 21 conducts data communication operations via the communication lines. The communication portion 21 transmits/receives data to/from the router s and the network operator terminal 3. The routing information receiving portion 22 receives the BGP communication data transmitted from the router 2 via the communication portion 21. The routing information receiving portion 22 receives the UPDATE message 11 from the router 2 in accordance with communication steps of the BGP.

A routing state table generation portion 23 receives the UPDATE message 11 from the routing information receiving portion 22. The routing state table generation portion 23 generates a routing state table based on the UPDATE message 11. The routing state table generation portion 23 registers the routing state table to the routing information database 24. The routing information database 24 stores the routing state table.

The routing information searching portion 25 transmits and receives communication data to/from the network operator terminal 3 via the communication portion 21. The routing information searching portion 25 receives the route search request 12 expressed in a manner based on SQL from the network operator terminal 3. The routing information searching portion 25 searches the routing information database 24 based on the route search request 12. The routing information searching portion 25 replies a search result 13 obtained by searching the routing information database 24 to the network operator terminal 3.

The database management portion 26 manages the routing information database 24. The database management portion 26 conducts operations with regard to the routing information database 24, for example, removing an unnecessary item of the database.

Next, the routing state table is explained which is generated by the routing state table generation portion 23. The routing state table stores information (a)-(p) shown below. The information (a)-(p) are integers (INTEGER) and characters (TEXT).

(a) "obs-id": "obs-id" is the identification information of a router (router ID) at an observation point, and is a string of characters. In general, the IP address is applied to the router ID.

(b) "obs-as": "obs-as" is the AS number of the AS at which a router of the observation point is provided.

It should be noted that the observation point is a point where the routes are observed. The router of the observation point observes the routes and generates the UPDATE message based on the observation results.

(c) "starttime": "starttime" is a number indicating a start time (year, month, day, hour, minute and second) of the route. A receiving time of the UPDATE message is used as the start time of the route.

(d) "endtime": "endtime" is a number indicating an end time (year, month, day, hour, minute and second) of the route. The end time is initially set to a future time (for example, 00:00:00 Jan. 1, 9999) which causes no practical problem.

(e) "prefix": "prefix" is a number generated by digitizing the IP address included in the prefix. If the prefix is "A. B. C. D/X", the IP address "A. B. C. D" is digitized in accordance with the following formula.

$$\text{"prefix"} = A \times (256^3) + B \times (256^2) + C \times (256^1) + D$$
$$= A \times 16777216 + B \times 65536 + C \times 256 + D$$

(f) "prefixlen": "prefixlen" is a number of bits of a subnet mask included in the prefix, and is a number which indicates the length of the prefix. If the prefix is "A. B. C. D/X", "X" is "prefixlen" which is the number of bits of the subnet mask.

(g) "exit": "exit" is a number indicating whether or not the route exists, "exit" is "1" if the route exists, and "exit" is "0" if the route does not exist. If the type of the UPDATE message is "ANNOUNCE", "exit" is "1", that is, the route exists. If the type of the UPDATE message is "WITHDRAW", "exit" is "0", that is, the route does not exist.

If "exist" is "0", that is, if the route does not exist, the following information (h)-(p) is meaningless. The information (h)-(p) is set only if the type of the UPDATE message is "ANNOUNCE" (this is a case of ANNOUNCE message). The information (i)-(p) is attribute information included in the ANNOUNCE message.

(h) "aspath": "aspath" is a string of characters indicating an AS path.

(i) "origin": "origin" is a number indicating the ORIGIN attribute of the attribute information included in the ANNOUNCE message.

(j) "nexthop": "nexthop" is a string of characters indicating the nexthop attribute of the attribute information included in the ANNOUNCE message. The IP address of the nexthop attribute expressed in characters is applied to the characters indicating the nexthop attribute.

(k) "localpref": "localpref" is a number indicating the local preference attribute of the attribute information included in the ANNOUNCE message.

(l) "med": "med" is a number indicating the MED attribute of the attribute information included in the ANNOUNCE message.

(m) "community": "community" is a string of characters indicating the Community attribute of the attribute information included in the ANNOUNCE message.

(n) "aggregation": "aggregation" is a number indicating the aggregation attribute of the attribute information included in the ANNOUNCE message. If the aggregation is included, "aggregation" is "1". If the aggregation is not included, "aggregation" is "0".

(o) "aggregation-id": "aggregation-id" is a string of characters indicating aggregation-id attribute of the attribute information included in the ANNOUNCE message. "aggregation-id" includes the router ID which has conducted the aggregation. If the aggregation is not conducted ("aggregation" is "0"), "aggregation-id" is meaningless.

(p) "aggregation-as": "aggregation-as" is a number indicating the aggregation-as attribute of the attribute information included in the ANNOUNCE message. "aggregation-as" indicates the AS number of the AS to which the router belongs that has conducted the aggregation. If the aggregation is not conducted ("aggregation" is "0"), "aggregation-as" is meaningless.

An example of the routing state table "routes" is shown which is expressed in a manner of SQL.

```
routes(
    obs-id           TEXT,
    obs-as           INTEGER,
    starttime        INTEGER,
    endtime          INTEGER,
    prefix           INTEGER,
    prefixlen        INTEGER,
    exist            INTEGER,
    aspath           TEXT,
    origin           INTEGER,
    nexthop          TEXT,
    localpref        INTEGER,
    med              INTEGER,
    community        TEXT,
    aggregation      INTEGER,
    aggregation-id   TEXT,
    aggregation-as   INTEGER,);
```

With regard to items of the routing information table that are characters (TEXT), it is preferable to store the characters in another table. In such a case, an example of the routing state table "routes" in a manner of SQL is as shown below.

```
routes(
    obs-id           INTEGER,
    obs-as           INTEGER,
    starttime        INTEGER,
    endtime          INTEGER,
```

-continued

```
prefix          INTEGER,
prefixlen       INTEGER,
exist           INTEGER,
aspath          INTEGER,
origin          INTEGER,
nexthop         TEXT,
localpref       INTEGER,
med             INTEGER,
community       TEXT,
aggregation     INTEGER,
aggregation-id  TEXT,
aggregation-as  INTEGER,
                :)obs-id-list(
obs-id-name     TEXT)aspath-list(
aspath-name     TEXT)
```

In this example, in the routing state table "routes", an ID "aspath" for identifying independent AS paths is managed in a form of numbers (INTEGER). Characters (TEXT) indicating the independent AS paths (such as 100 200 300) is stored as an element "aspath-name" included in a table "aspath-list". Therefore, with regard to a case in which the same AS path is stored in the multiple routing state tables, it is possible to reduce the storage area for storing the routing state tables, and it is possible to improve the speed of searching the database.

Next, in reference to FIG. 3, operations of generating the routing state table by the routing state table generation portion 23 shown in FIG. 2 are explained. FIG. 3 is a flowchart showing generation steps of the routing state table of this embodiment.

The routing information receiving portion 22 receives the UPDATE message 11 (routing information) from the router 2. When the routing state table generation portion 23 receives the UPDATE message 11 from the routing information receiving portion 22, a routing state table generation operation shown in FIG. 3 is started. The routing state table generation portion 23 conducts the routing state table generation operation based on the UPDATE message 11 (hereinafter, received UPDATE message) received from the routing information receiving portion 22.

In FIG. 3, at Step S1, the routing state table generation portion 23 searches the routing state table included in the routing information database 24 based on the received UPDATE message. In this operation, searched items are "obs-id", "obs-as", "prefix", "prefixlen" and "endtime". The routing state table generation portion 23 extracts the routing state table including the above-described all items that satisfy following conditions.

The first condition is that the "obs-id" should be the same as the router ID of the router 2 which has transmitted the received UPDATE message. The second condition is that the "obs-as" should be the same as the AS number of the AS including the router 2 which has transmitted the received UPDATE message. The third condition is that the "prefix" should be the same as the IP address of the prefix included in the received UPDATE message. The fourth condition is that the "prefixlen" should be the same as the number of bits of the subnet mask included in the prefix of the received UPDATE message. The fifth condition is that "endtime" should be the initial value.

Next, at Step S2, based on results of Step S1, the routing state table generation portion 23 determines whether or not the routing state table is found. The routing state table generation portion 23 conducts an operation of Step S3 if the routing state table is detected, and the routing state table generation portion 23 conducts an operation of Step S5 if the routing state table is not detected.

At Step S3, the routing state table generation portion 23 determines whether or not, with regard to the routing state table extracted at Step S1, the information (i)-(p) is the same as the attribute information of the received UPDATE message. In this operation, if the type of the UPDATE message is "ANNOUNCE", the routing state table generation portion 23 investigates each of the information (i)-(p). If the type of the UPDATE message is "WITHDRAW", the routing state table generation portion 23 detects that the attribute information does not match. Based on the results of Step S3, if all items of the attribute information match, the routing state table generation portion 23 finishes the operation of FIG. 3 because the route indicated by the routing state table extracted at Step S1 is still available. On the other hand, if any one of items of the attribute information does not match, the routing state table generation portion 23 conducts the operation of Step S4.

At Step S4, the routing state table generation portion 23 overwrites the "endtime" of the routing state table extracted at Step 1 with the received time of the received UPDATE message, and updates the routing information database 24.

Due to such an operation, in the routing information database 24, it is registered that the route indicated by the routing state table extracted at Step S1 is closed at the received time.

Next, at Step S5, the routing state table generation portion 23 creates a new routing state table based on the received UPDATE message and registers the new table with the routing information database. Due to such an operation, the route indicated by the received UPDATE message that is opened at the received time is registered with the routing information database 24.

Next, at Step S6, the routing state table generation portion 23 creates an index with regard to the newly registered routing state table that can be used for searching the routing information database 24. The index is created with regard to "prefix" of the routing state table. Due to such an operation, it is possible to improve the searching speed of the routing information database 24 when a search item includes "prefix". The Internet a uses tremendous number of "prefix", and it is very useful if a search operation using "prefix" as a search item is improved.

It should be noted that a generally used function (function of creating index) of a database system can be applied to such a creation operation of the index. On the other hand, it is possible to apply another solution in which the index regarding "prefix" is generated by using such as an independently provided hash function table.

After conducting an operation of Step S6, operations shown in FIG. 3 are finished.

Next, an operation of the database management portion 26 shown in FIG. 2 is explained.

The database management portion 26 removes or drops the routing state tables including old information stored in the routing information database 24. This is because it is necessary to prevent the routing information table 24 from increasing in size while increasing the number of stored routing state tables. It is preferable that the routing information database 24 stores the routing information of an interval (for example, one month) which is a sufficient time in a practical use without problems. Therefore, the routing information which has passed a predetermined interval is removed. The routing state table is removed if "endtime" is older than a predetermined interval before the present time. It is preferable to apply a removing method, such as removing at an interval shorter than the predetermined interval. For example, if a removing operation of the routing state tables is conducted every day in a condition in which the predetermined interval is one month, the database management portion 26 searches the routing state table having "endtime" which is one month older than the present time and removes the detected routing state table.

Next, a routing information searching operation using the routing information database 24 of this embodiment is explained.

The routing information database 24 of this embodiment can quickly respond to route searching requests issued by the network operator. The network operator specifies all or a portion of items including an address/address space, time and observation point in order to issue a request for the corresponding routing information (information stored in the routing state tables).

There are two types for specifying the time, that are, specifying one time point and specifying two time points. When the one time point is specified, the routing status tables are searched for that have been existing since the specified time. When the two time points are specified, the routing status tables are searched for that have been existing in an interval between the specified time points.

There are three types for specifying the address, that are, a first way of specifying the prefix, a second way of specifying the prefix and specifying the IP address. When the prefix is specified, both "prefix" and "prefixlen" are specified. When the IP address is specified, only "prefix" is specified. In the first way of specifying the prefix, the routing state tables are searched for which have exactly the same "prefix" and "prefixlen" as the specified "prefix" and "prefixlen". In the second way of specifying the prefix, the routing state tables are searched for which have "prefix" and "prefixlen" including the specified "prefix". In a case of specifying the IP address, the routing state tables are searched for which have "prefix" and "prefixlen" including the specified "prefix".

Examples of descriptions of SQL for the route searching requests are shown below.

[Example of descriptions of SQL for the route searching request in a case of specifying one time point (time 1)]>select * from routes where starttime<=time1 and endtime>=time1

[Example of descriptions of SQL for the route searching request in a case of specifying two time points (time 1 and 2)]>select * from routes where (starttime<time1 and endtime>=time1) or (starttime<=time2 and endtime>time2)

[Example of descriptions of SQL for the route searching request in a case of the first way of specifying the prefix] >select * from routes where prefix=findprefix and prefixlen=findprefixlen Following points should be noted in a case in which the specified prefix is "E.F.GH/Y".

Specified prefix: "findprefix"=E×(256^3)+F×(256^2)+G×(256^1)+H

End of specified prefix: "findprefixend"="findprefix"+2^(32−Y)−1

[Example of descriptions of SQL for the route searching request in a case of the first way of specifying the prefix or of specifying IP address]

Here, an example of descriptions in a case of the first way of specifying the prefix is shown, and the length of the prefix is in a range of 24-8 bits. In a case of specifying the IP address, the length of the prefix is in a range of 32 bits.

>select * from routes where ((prefix=findprefix & 0xFFFFFF00 or prefix=findprefix & 0xFFFFFE00 or prefix=findprefix & 0xFFFFFC00 or prefix=findprefix & 0xFFFFF800 or prefix=findprefix & 0xFFFFF000 or prefix=findprefix & 0xFFFFE000 or prefix=findprefix & 0xFFFFC000 or prefix=findprefix & 0xFFFF8000 or prefix=findprefix & 0xFFFF0000 or prefix=findprefix & 0xFFFE0000 or prefix=findprefix & 0xFFFC0000 or prefix=findprefix & 0xFFF80000 or prefix=findprefix & 0xFFF00000 or prefix=findprefix & 0xFFE00000 or prefix=findprefix & 0xFFC00000 or prefix=findprefix & 0xFF800000 or prefix=findprefix & 0xFF000000) and ((prefix=findprefix & 0xFFFFFF00 and prefixlen=24) or (prefix=findprefix & 0xFFFFFE00 and prefixlen=23) or (prefix=findprefix & 0xFFFFFC00 and prefixlen=22) or (prefix=findprefix & 0xFFFFF800 and prefixlen=21) or (prefix=findprefix & 0xFFFFF000 and prefixlen=20) or (prefix=findprefix & 0xFFFFE000 and prefixlen=19) or (prefix=findprefix & 0xFFFFC000 and prefixlen=18) or (prefix=findprefix & 0xFFFF8000 and prefixlen=17) or (prefix=findprefix & 0xFFFF0000 and prefixlen=16) or (prefix=findprefix & 0xFFFE0000 and prefixlen=15) or (prefix=findprefix & 0xFFFC0000 and prefixlen=14) or (prefix=findprefix & 0xFFF80000 and prefixlen=13) or (prefix=findprefix & 0xFFF00000 and prefixlen=12) or (prefix=findprefix & 0xFFE00000 and prefixlen=11) or (prefix=findprefix & 0xFFC00000 and prefixlen=10) or (prefix=findprefix & 0xFF800000 and prefixlen=9) or (prefix=findprefix & 0xFF000000 and prefixlen=8))

Following points should be noted in a case in which the specified prefix is "E.F.GH/Y".

Specified prefix: "findprefix"=E×(256^3)+F×(256^2)+G×(256^1)+H

End of specified prefix: "findprefixend"="findprefix"+2^(32−Y)−1

It should be noted that the specified IP address is "E.F.GH/Y, however, Y=32" in a case of specifying the IP address.

In the "Example of descriptions of SQL for the route searching request in a case of the first way of specifying the prefix or of specifying IP address" described above, first, a searching range is tightly targeted by conducting a searching operation using "prefix" to which the index is provided. Next, a searching operation which uses the searching item "prefixlen" in addition is conducted with regard to the tightly targeted searching range. In accordance with such an operation, it is possible to conduct a high speed searching operation by using the index applied to "prefix".

In accordance with the above-described embodiment, the present and past routing state tables are stored in the routing information database 24, and consequently, it is possible to provide both the present and past routing information in response to a request from the network operator. In addition, the routing information database 24 is updated every time the UPDATE message 11 is received from the router 2, and consequently, it is possible to quickly output or prepare the latest routing information. The routing state table stores a range of the address space ("prefix" and "prefixlen") obtained by digitizing the prefix, hence, it is possible to improve the speed of a searching operation when a range of the address space is specified, and it is possible to improve the speed of searching the routing information. The index is created with regard to the "prefix" of the routing state table, hence, it is possible to greatly improve a speed of searching operation when a "prefix" is used as an searching item, and consequently, it is possible to greatly improve the searching speed of the routing information. Therefore, it is possible to shorten the time for responding to a search request for the present or past routing information issued by the network operator.

In addition, in accordance with this embodiment, it is possible to obtain the following advantages.

(1) The network operator can search the internet routing information provided by external companies or groups and use such information for investigating the present/past connection problems. With regard to the present connection problems, it is possible to shorten the time for solving the problem because it is possible to understand or grasp the internet routing information. With regard to the past connection problems, it is possible to quickly provide answers with regard to trouble reports from the clients. For example, when the ISP receives the trouble report from the client, it is possible to obtain the routing information in a short time by using the trouble time and the problematic address (address of the client or address of such as a server which the client was accessing), and it is possible to quickly respond a state of the problem to the client.

(2) Because it is possible to apply the generally used database software, the network operator can search the routing information necessary for investigating the connection problems by using the search functions of the database software without providing his own analysis tools.

(3) The routing information management apparatus 1 which provides the routing information can avoid uploading operations of external files that cause a processing and communication load for the apparatus and the communication network. Therefore, it is possible to constitute the routing information management apparatus 1 by using comparatively small amount of resources. In addition, it is possible to reliably provide the routing information to a lot of network operators.

It should be noted that the routing information management apparatus 1 of this embodiment can be implemented by providing a special purpose hardware, and in another way, the routing information management apparatus 1 of this embodiment can be constituted from a computer system such as a personal computer that realizes functions of the routing information management apparatus 1 shown in FIG. 2 by executing a computer program.

It should be noted that the routing information management apparatus 1 is connected to peripheral equipments such as an input apparatus and a display apparatus (not shown in figures). Here, the input apparatus means a device such as a keyboard, a mouse, and the like. The display apparatus means a CRT (Cathode Ray Tube), a liquid crystal display apparatus, and the like.

It is possible for the peripheral equipment to be directly connected to the routing information management apparatus 1 or connected via a communication line.

It is possible for the program for realizing the functions shown in FIG. 3 to be stored or recorded in a computer-readable medium, so that the computer reads the program stored or recorded in the medium, and the program is executed in order to conduct the routing information management operation. It should be noted that the "computer system" here can include an OS and hardware such as peripheral equipments.

In a case in which the "computer system" can use a WWW system, the computer system includes a homepage environment (or an environment to display).

The "computer-readable medium" means a rewritable non-volatile memory such as a flexible disc, a magneto-optical disc, a ROM, a flash memory, and the like, a portable medium such as a DVD (Digital Versatile Disk), a storage device such as a hard disc set inside the computer system.

Moreover, "computer readable medium" includes a volatile memory (such as a DRAM (Dynamic Random Access Memory)) inside the computer systems used for a server or a client to which the programs are transmitted via a network like the Internet or a communication line like a telephone line, which saves the programs for a certain time period.

The program above can be transmitted from the computer storing this program in the storage apparatus or the like via a transmission medium to another computer system. "Transmission medium" transmitting the program is a medium such as a network (communication network) like the Internet or a communication line (line) like a telephone line that has a function to transmit information.

It is possible for the above program to be a program for realizing a part of the above -described functions. Moreover, it is possible for the program to be a so-called difference file (difference program) which realizes the above functions by being combined with a program already stored in the computer.

The embodiment of the present invention is explained above, however, a concrete constitution of the present invention is not considered to be limited by the embodiments above, and the present invention includes constitutional modifications if they are inside the fundamental theory of the present invention.

For example, the routing information management apparatus can be implemented as an independent apparatus or implemented as an apparatus which is integrated with a router.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A routing information management apparatus, comprising:
   a routing information receiving unit which receives routing information for broadly notifying a change/withdrawal of a communication route from an observation apparatus of communication routes; and
   a routing state table generation unit which generates a routing state table with regard to each of the communication routes including both a route existing time based on a received time of the routing information and a range of an address space indicated by a prefix involved in the routing information, and which stores the routing state table in a routing information database,
   wherein the prefix is "A.B.C.D/X", which is a combination of an IP address A.B.C.D. and the number of bits of the subnet mask, "X", wherein the IP address is digitized in accordance with formula $$A \times 16777216 + B \times 655536 + C \times 256 + D.$$

2. A routing information management apparatus according to claim 1, further comprising an index generation unit which creates an index used for searching the routing information database.

3. A routing information management apparatus according to claim 1, further comprising a routing information searching unit which conducts a routing information searching operation by accessing the routing information database while using the index.

4. A routing information management apparatus according to claim 1, further comprising a database management unit removing the routing state table if a predetermined time has passed after the route existing time.

5. A computer program stored on a non-transitory computer readable medium comprising computer executable instructions for:
    receiving routing information which broadly notifies a change/withdrawal of a communication route and which is received from an observation apparatus of communication routes;
    generating a routing state table of each of the communication routes including both a route existing time based on a received time of the routing information and a range of an address space indicated by a prefix involved in the routing information, wherein the prefix is "A.B.C.D/X", which is a combination of an IP address A.B.C.D. and the number of bits of the subnet mask, "X", wherein the IP address is digitized in accordance with formula A×16777216+B×655536+C×256+D; and storing the routing state table in a routing information database.

6. A computer program stored on a non-transitory computer readable medium according to claim 5, further comprising computer executable instructions for
    creating an index used for searching the routing information database.

7. A computer program stored on a non-transitory computer readable medium according to claim 5, further comprising computer executable instructions for
    conducting a routing information searching operation by accessing the routing information database while using the index.

8. A computer program stored on a non-transitory computer readable medium according to claim 5, further comprising computer executable instructions for
    removing the routing state table if a predetermined time has passed after the route existing time.

* * * * *